Dec. 7, 1971  E. D. WILKERSON  3,624,915
WHEEL ALIGNMENT APPARATUS
Filed Jan. 5, 1970  2 Sheets-Sheet 2
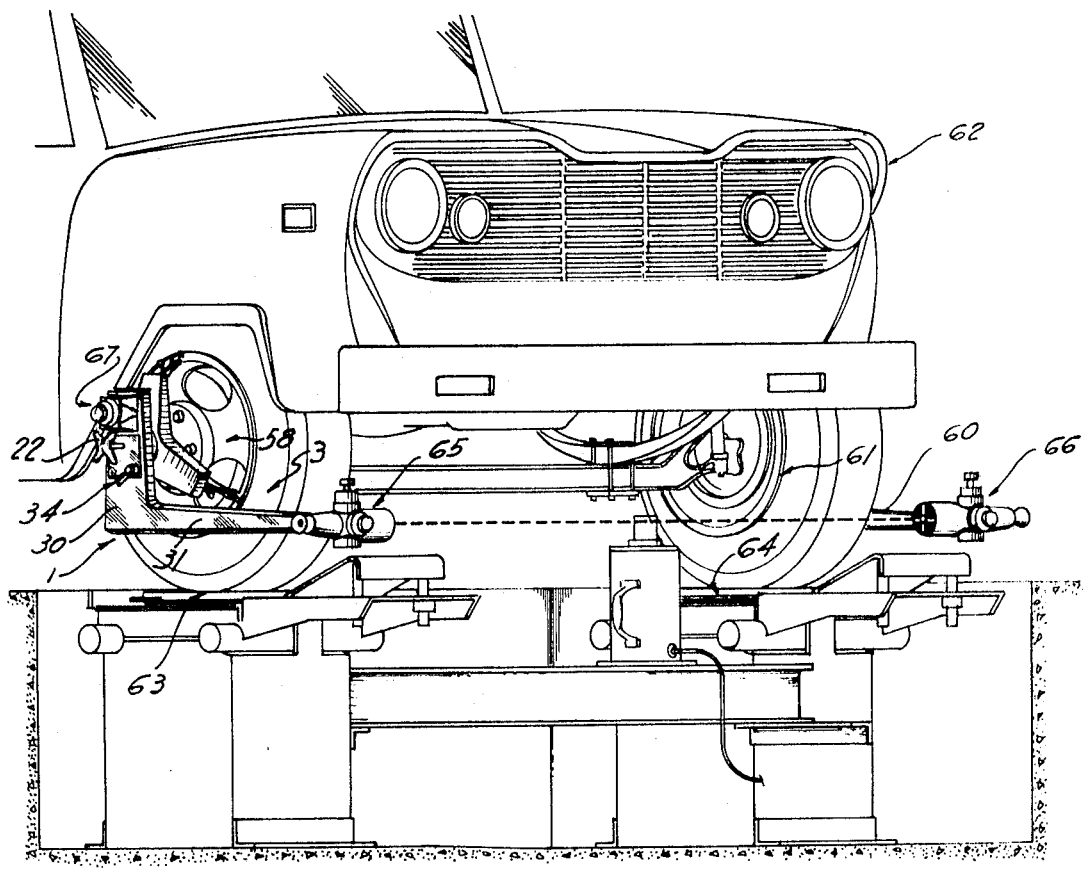
FIG. 8.
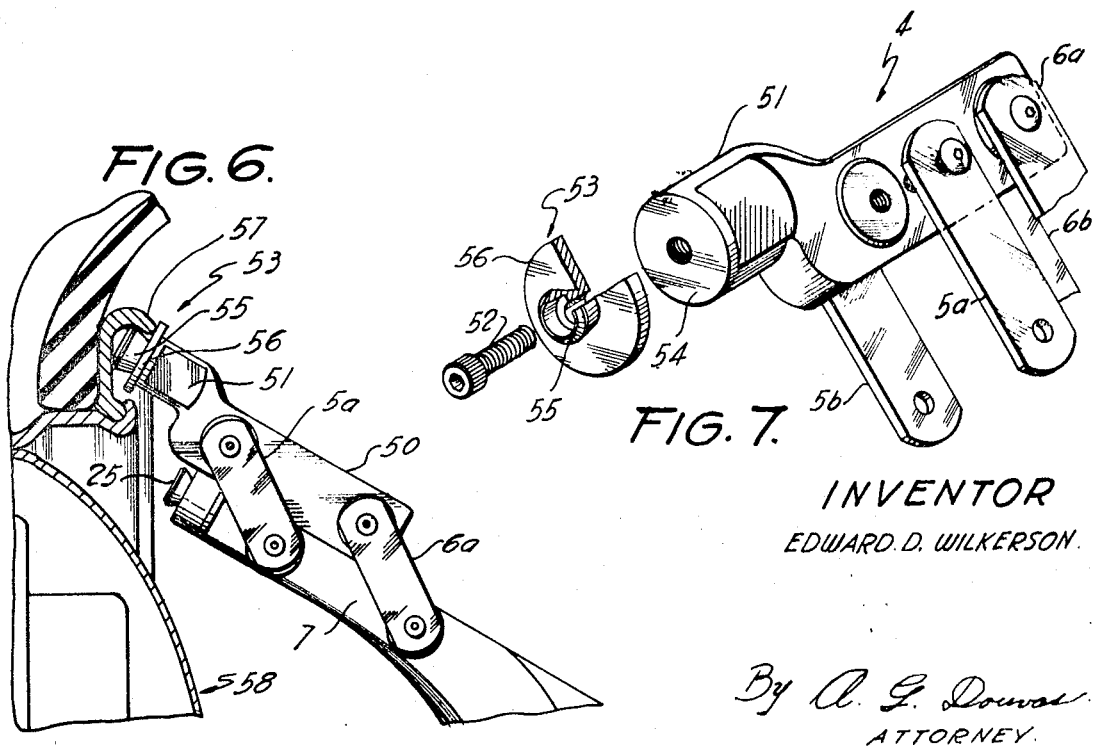
FIG. 6.
FIG. 7.
INVENTOR
EDWARD D. WILKERSON.
By A. G. Douvas
ATTORNEY.

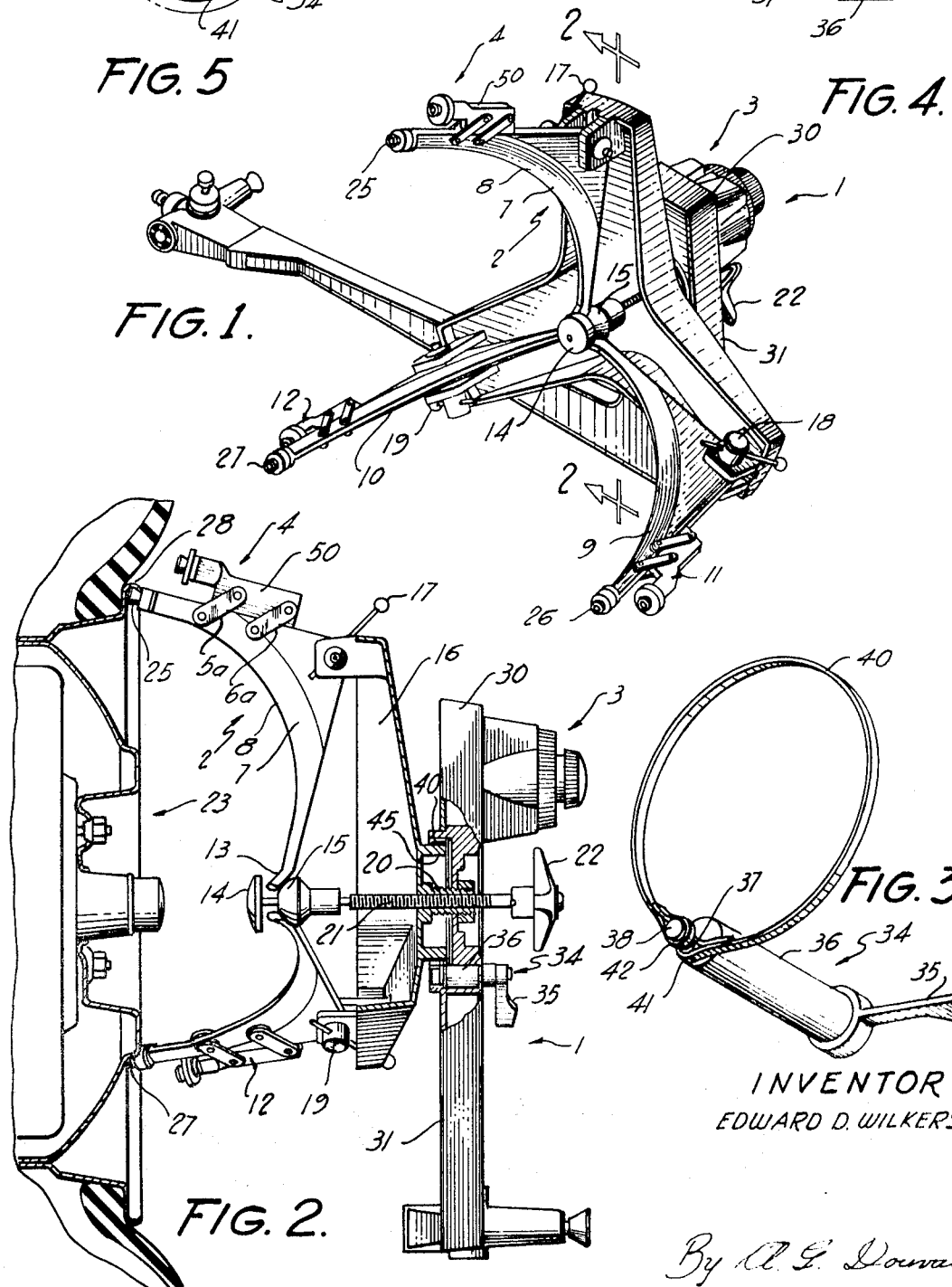

United States Patent Office 3,624,915
Patented Dec. 7, 1971

3,624,915
WHEEL ALIGNMENT APPARATUS
Edward D. Wilkerson, 595 Valley Road,
Orange, N.J. 07050
Filed Jan. 5, 1970, Ser. No. 658
Int. Cl. G01b 9/08, 11/26
U.S. Cl. 33—203.18                                    10 Claims

ABSTRACT OF THE DISCLOSURE

This disclosure relates to improvements in the following features of wheel alignment equipment: (1) the wheel clamp, (2) the pivot post, and (3) the brake for locking the pivot post to the wheel clamp.

The improvement in the wheel clamp relates to a prior art clamp in which at least three support legs carrying wheel rim locks are adjustably driven into engagement with the wheel rim. The particular improvement in the clamp comprises an extensible leg with a wheel rim lock movably coupled relative to and supported on each of the support legs by a parallelogram linkage. Each of the extensible legs is manually placed to project beyond its associated support leg when it is desired to align wheels having relatively large diameters.

The improvement in the pivot post adapted to the foregoing extensible leg type clamp relates to having a pivot post of L-shaped configuration. This post, in the usual alignment operating position, includes a generally vertical supporting base and a generally horizontal optical-transit arm. The arm is attached to the lower end of the support base so that visual sighting may be generally made below the bumper of a vehicle having a high hood, such as a truck.

The improvement in the brake adapted to the foregoing clamp and pivot post includes a manually operated lock handle, a shaft rotated by the handle to drive two eccentric shaft sections, and a loop band having two ends each of which is fixed to a different shaft section. The band closely envelops a circular collar fixed to the wheel clamp. Rotation of the shaft selectively tightens and loosens the band about the collar to fix securely and accurately the post to the clamp.

BACKGROUND OF THE INVENTION INCLUDING THE PRIOR ART

Within recent years increased emphasis has been placed upon the desirability of aligning large wheels, such as those found upon buses and trucks. Most vehicles of this class have rim diameters extending to about 24 inches.

Accordingly, it is necessary to design a wheel clamp to support the geometric alignment components upon such a wheel. At the same time it would be highly utilitarian, as well as economically desirable, to design the wheel clamp so that it wil attach to the smaller wheels of passenger cars.

U.S. Pat. 3,445,936, issued to the inventor on May 27, 1969, discloses a wheel clamp which is admirably suited for passenger car wheels. This wheel clamp has been improved herein so that it is optionally adaptable also to the larger wheels of buses and trucks.

Likewise, the cited patent discloses a pivot post which is elongated and generally straight to enable alignment measurements to be made over the hood of a passenger car. In view of the fact that many buses and trucks have a relatively high hood, a post to enable over-the-hood readings would be excessively long and unwieldy. Accordingly in this invention, the pivot post is modified into an L-shape to enable measurements to be made in front of the bus or truck and generally below an otherwise obstructing bumper.

Generally, trucks and buses are driven upon pit racks for alignment adjustment; therefore, the alignment operator can make the necessary adjustments without undue bending, even though the optical-transit is at about the bumper level.

Since in the above arrangement the optical arm of the post is generally horizontal, thereby generating a large turning torque relative the wheel clamp, it is desirable to improve the brake which locks the pivot post to the wheel clamp. The brake must not introduce changes in the relative position of the components when it is tightened, and also it must hold securely the post during alignment measurements.

SUMMARY OF THE INVENTION

The wheel alignment features of this invention are particularly adapted for making alignment measurements on buses and trucks. At the same time these features may also be incorporated in passenger car aligners.

The improved wheel clamp in a preferred commercial model extends the rim diameter range to 24 inches, enables the supported post to be relatively short, and the post to be securely held to the wheel clamp by a more efficient brake.

The structure for accomplishing these objects is briefly described in the abstract.

DETAILED DESCRIPTION OF THE DRAWINGS

FIG. 1 is a perspective view of an alignment unit of this invention viewed generally from the bottom to show the assemblage of legs which comprise the wheel clamp;

FIG. 2 is a section view taken along line 2—2 of FIG. 1 and showing an alignment unit clamped to a wheel of small diameter, with the extensible legs in the withdrawn position;

FIG. 3 is a perspective view of the eccentric shaft and the band subassembly of the brake, which locks the aligner post in the required position relative the wheel clamp;

FIG. 4 is a side elevation of a portion of the eccentric shaft of FIG. 1;

FIG. 5 is an end view of the structure of FIG. 4 with the eccentric sections midway between brake hold and brake release positions;

FIG. 6 is a fragmentary view of that portion of a wheel clamp with the extensible leg in the projected position to clamp wheels of a large diameter;

FIG. 7 is a partially exploded view of the extensible leg showing the details of various components; and FIG. 8 is a perspective view showing the application of the aligner of this invention to a truck supported upon a pit rack.

DETAILED DESCRIPTION OF THE INVENTION

Referring now to the drawings, the basic aligner shown therein incorporates various improvements over that shown in the U.S. Pat. 3,445,936 issued to the inventor on May 27, 1969. Only the particular improvements which are directed to the wheel clamp, the brake clamp, and the particular form of the post, will be discussed in detail. With the exception of these improvements, reference should be had to the specification and drawings of the aforementioned Wilkerson patent.

Referring now to FIGS. 1 and 2, aligner unit 1 is only one of two units as will be explained with reference to FIG. 8, necessary to complete an entire aligner. Basically, this aligner unit comprises a wheel clamp 2, which is affixed to a wheel during an alignment operation, and an L-shaped aligner post 3 which is rotatably coupled to wheel clamp 2.

One of the improvements of this invention relates to the clamp extension 4 (typical of three such extensions) which is pivotally mounted by pivot link pair 5a, b and pivot link pair 6a, b to an associated right angle wheel clamp leg 7 which is reinforced by an arch-like portion 8.

Wheel clamp 2 comprises three identical legs 7, 9 and 10 each of which carries an individual clamp extension 4, 11 and 12, respectively.

In view of the fact that clamp extensions 4, 11 and 12 are identical and legs 7, 9 and 10 are identical, detailed reference will be made only to clamp extension 4 and its associated leg 7 in the following portions of the specification. It should be understood, however, the two other wheel clamp legs and their associated clamp extensions operate in an identical manner to that of components 4, 7.

The inner central portion of wheel clamp leg 7 is formed with a cam follower foot 13 which is sandwiched between retaining cap 14 and ball cam 15.

Wheel clamp legs 7, 9 and 10 are adjustably coupled to spider body 16 of the wheel clamp by means of runout cam levers and their associated eccentric members 17, 18 and 19 respectively. The function of elements 17, 18 and 19 in effecting runout corrections is described in the aforementioned Wilkerson patent and does not constitute part of the invention described in this specification.

Spider body 16 is formed with internally threaded stud 20 which mates with threaded shaft 21. Ball cam 15 is coupled to the left end of shaft 21, and the right end of this shaft carries clamp control 22 which includes an overriding clutch not described herein but which is adequately described in the Wilkerson patent.

In the event it is desired to attach aligner unit 1 to wheel 23, which has a relatively small rim diameter of the order of 10 to 17 inches (typical of substantially all standard and luxury automobiles, foreign cars, compacts and light trucks), clamp extension 4 is withdrawn as is shown in FIG. 2. Likewise clamp extensions 11 and 12 are also withdrawn as is shown in FIG. 1.

Contact buttons 25, 26 and 27 affixed to clamp legs 7, 9 and 10 are placed within wheel rim 28 and knob 22 is manually turned so that ball cam 25 moves to the left (as is shown in FIG. 1) so that contact buttons 25, 26 and 27 firmly engage wheel rim 28, to thus hold aligner 1 adequately with respect to wheel 23.

After this wheel clamping engagement is effected, it is necessary to make the runout correction as described in the cited Wilkerson patent. Assuming this runout correction has been made, then L-shaped aligner post 3 as is shown in FIG. 2 must be clamped or otherwise braked relative the associated wheel so that the supporting base 30 of the post is vertical and the optical-transit arm 31 is generally horizontal as is shown in FIG. 8.

A second novel feature of this invention relates to the structure for braking post 3 relative wheel clamp 2. In particular, this brake 34 includes (referring initially to FIGS. 3, 4 and 5) post brake lever 35 which is affixed to a cylindrical shaft 36 fixed to lever 35 and two eccentrically mounted shaft sections 37 and 38 (see FIGS. 4 and 5) rigidly fixed to the left end of shaft 36.

It should be noted, as is shown in FIG. 4, that eccentrically mounted shaft sections 37 and 38 have a longitudinal axis which is offset from the longitudinal axis of shaft 36. In particular, the longitudinal axis of eccentric section 38 is above the axis of shaft 36, and the longitudinal axis of eccentric section 37 is below the longitudinal axis of shaft 36.

The ends of brake band 40 (FIG. 3) are formed with loop 41 which envelops eccentric section 37, and loop 42 which envelops eccentric section 38.

As is shown in FIG. 2, an annular collar 45 is formed at the center of spider body 16. Brake band 40 envelops closely the outer periphery of collar 45, and when brake lever 35 is turned in a clockwise direction, as is viewed in FIG. 5, so that cam sections 38 and 37 rotate approximately 90 degrees, brake band 40 is tightened firmly around the periphery of annular collar 45 so as to brake or otherwise fix aligner post 3 relative wheel clamp 2.

In view of the fact that this braking action is effected by a single shaft 36, once the horizontally disposed optical-transit arm 31 is positioned, actuation of brake lever 35 does not detrimentally alter this position.

In the event that it is desired to align, for example, wheels having relatively large rim diameters, such as those usually found on heavy duty trucks and buses of the order of 15 inches to 24 inches, it is necessary to functionally employ clamp extensions 4, 11 and 12 by manually moving such extensions from the withdrawn position shown in FIG. 1 to the extended position shown in FIG. 6.

In particular, each of these clamp extensions (using clamp extension 4 as a typical example since all extensions are identical) comprises as an extensible leg 50 which supports an offset foot 51. Extensible leg 50 is tapped so as to receive pivot link pair 5a, b and its associated screws and pivot link pair 6a, b and its associated screws. Likewise, offset foot 51 is centrally tapped along its longitudinal axis so that socket screw 52 rigidly fixes rim lock 53 to face 54 of offset cylindrical foot 51. In particular, lock 53 includes a hardened steel contact button 55 which projects from the face of circular limiting flange 56.

It should be noted that extensible leg 50 and the adjacent portion of wheel clamp leg 7 together with pivot link pair 5a, b and pivot link pair 6a, b form a parallelogram linkage which may be manually withdrawn as is shown in FIG. 2 so that foot 51 and its associated lock 53 are removed from the wheel rim; or, alternatively, this parallelogram linkage may be manually projected so that foot 51 and lock 53 carried thereon can engage rim 57 of truck wheel 58 (FIG. 8). In the usual instance, limiting flange 56 contacts the outer lip of rim 57 so that all of the legs of wheel clamp 2 are in alignment relative to rim lip periphery of the truck wheel. Wheel clamp 2, with clamp extensions 4, 11 and 12 projecting, as is generally exemplified in FIG. 6, are tightened upon the associated wheel by means of clamp control 22 as previously outlined with reference to the structure of FIG. 2.

FIG. 8 shows the attachment of aligner unit 1 to truck wheel 58 and aligner unit 60 which is attached to truck wheel 61.

Wheels 58 and 61 are the front wheels of a truck 62 which has been driven upon a pit rack so that wheel 58 is carried on a turntable 63 and wheel 61 is carried on a turntable 64.

In view of the fact that most truck cabs are relatively high, it is not feasible to take alignment measurements over the top of the truck hood inasmuch as this necessitates an aligner post which is relatively long and therefore cumbersome to handle. Consequently, the aligner post, such as L-shaped aligner post 3 of aligner unit 1 is formed with a base 30 which in the alignment position enables the optical-transit arm 31 to extend horizontally in front of the truck and below the truck bumper. With this arrangement, the optical-transit mechanism 65 of aligner unit 1 and the optical-transit mechanism 66 of aligner unit 60 have an unobstructed optical path therebetween in front of the truck. Base section 30 of aligner unit 1 and the corresponding base section of aligner unit 60 (not shown) carry the caster mechanisms such as caster mechanism 67 of aligner unit 1. Detailed operation of the alignment structure described in this specification is exactly the same as that set forth in Wilkerson U.S. Pat. 3,445,936, with the exception that improvements have been made (1) in the wheel clamp mechanism so that the larger wheel diameters of trucks may be accommodated by the use of clamp extensions 4, 11 and 12, (2) the aligner post may be fixed relative the wheel after the runout test has been accomplished through the use of the improved brake mechanism generally shown in FIGS. 2 through 5, and (3) notwithstanding the increased size of the average truck the use of an L-shaped aligner post as outlined in the specification enables the aligner to remain relatively small in physical dimensions so as not to be manually unwieldy during the alignment operation.

It should be understood that the above described specification is merely illustrative of the principles of this invention, and that modifications can be made without departing from the scope of the invention.

What is claimed is:

1. In wheel alignment apparatus including a wheel clamp having support means in which at least three support legs carrying wheel rim locks may be adjustably driven into engagement with a wheel rim, a first imaginary circle defined by said legs separated and dispersed around the periphery thereof, where at least one leg is located in each half circle of the first imaginary circle, the improvement comprising an extensible leg with a wheel rim lock movably coupled relative to and supported by each of said legs, and in which each of said extensible legs may be moved from a withdrawn position to an extended position to project beyond its support leg, said legs when extended defining a second imaginary circle having a diameter greater than said first imaginary circle.

2. The apparatus of claim 1 in which one or more pivot links couple each of the extensible legs to its associated support leg.

3. The apparatus of claim 2 in which there are at least two separated pivot links coupling each of the extensible legs to its associated support leg thereby forming an adjustable parallelogram linkage.

4. The apparatus of claim 3 in which each extensible leg rests directly upon its support leg in both the withdrawn and the projecting position of the extensible leg.

5. The apparatus of claim 3 in which there are two separated pivot link pairs, with each pair having a separate link on each side of the associated support and extensible legs, thereby forming an adjustable parallelogram linkage on each side of the coupled legs.

6. The apparatus of claim 4 in which each extensible leg includes an outwardly offset foot which carries the rim lock for that leg to thereby further increase the rim diameter of the wheels to which the wheel clamp may be applied.

7. The apparatus of claim 1 in which the wheel clamp carries a pivot post of L-shaped configuration, which post in the usual alignment operating position includes a generally vertical supporting base and a generally horizontal optical-transit arm which arm is attached to the lower end of the supporting base.

8. The apparatus of claim 7 in which the pivot post is fixed to the wheel clamp by a brake, comprising a collar fixed to the wheel clamp, a manually operated lock lever, a shaft rotated by the handle and the shaft supporting two eccentrically located shaft sections, a loop band having two ends each of which is fixed to the wheel clamp with the band closely eveloping the collar, whereby rotation of the shaft selectively tightens and loosens the band about the collar to fix securely the post to the wheel clamp.

9. In wheel alignment apparatus including a wheel clamp having support means on which at least three support legs carrying wheel rim locks may be adjustably driven into engagement with a wheel rim, a first imaginary circle defined by said legs separated and dispersed substantially equidistant around the periphery thereof, the improvement comprising an extensible leg with a wheel rim lock movably coupled relative to and supported by each of said legs, and in which each of said extensible legs may be moved from a withdrawn position to an extended position to project beyond its said legs when extended a second imaginary circle having a diameter greater than said first imaginary circle.

10. In wheel alignment apparatus including a wheel clamp having support means on which at least three support legs carrying wheel locks may be adjustably driven into engagement with a circular portion of the wheel whose center coincides with the axis of rotation of the wheel, a first imaginary circle defined by said legs separated and dispersed around the periphery thereof, where at least one leg is located in each half circle of the first imaginary circle, the improvement comprising an extensible leg with a wheel lock movably coupled relative to and supported by each of said legs, and in which each of said extensible legs may be moved from a withdrawn position to an extended position to project beyond its support leg, said legs when extended defining a second imaginary circle having a diameter greater than said first imaginary circle.

References Cited
UNITED STATES PATENTS 3,445,936   5/1969   Wilkerson.

LEONARD FORMAN, Primary Examiner

P. G. FOLDES, Assistant Examiner

U.S. Cl. X.R.

33—46 W